(12) United States Patent
Chen et al.

(10) Patent No.: US 9,654,430 B2
(45) Date of Patent: May 16, 2017

(54) COMMUNICATING WITH RECIPIENT EMAIL SERVER WHILE COMPOSING EMAIL

(75) Inventors: Yu-Jin Chen, Sinjhuang (TW);
Ming-Fa Hsu, Taoyuan (TW);
Chen-Yu Kuo, SanChung (TW); Kang Liang Liu, Taipei (TW); Mark D. Rogalski, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 13/029,183

(22) Filed: Feb. 17, 2011

(65) Prior Publication Data
US 2012/0215852 A1 Aug. 23, 2012

(51) Int. Cl.
*H04L 12/58* (2006.01)

(52) U.S. Cl.
CPC .................... *H04L 51/12* (2013.01)

(58) Field of Classification Search
CPC ..... G06Q 10/107; H04L 12/585; H04L 12/58; H04L 12/581; H04L 12/5855
USPC ........................................................ 709/206
See application file for complete search history.

(56) References Cited

U.S. PATENT DOCUMENTS

| 8,463,857 | B2 * | 6/2013 | Choi ............................ 709/206 |
| 2002/0120600 | A1 * | 8/2002 | Schiavone et al. ............... 707/1 |
| 2006/0053279 | A1 | 3/2006 | Coueignoux |
| 2009/0240780 | A1 * | 9/2009 | Brown et al. ................. 709/206 |
| 2010/0324987 | A1 * | 12/2010 | Benisti et al. ............. 705/14.39 |

* cited by examiner

*Primary Examiner* — Vivek Srivastava
*Assistant Examiner* — Sibte Bukhari
(74) *Attorney, Agent, or Firm* — Thomas E. Tyson; Gregory K. Goshorn; Greg Goshorn, P.C.

(57) ABSTRACT

Provided are techniques for the transmission of electronic mail (email). While a user composes an email message and once an intended recipient has been entered, negotiation modules associated with client and server computers check both the recipient and attributes of the message as they are entered. The user is notified if there is an issue with the intended recipient and alternative recipients may be suggested. The user is also notified if a particular attribute exceeds a defined limit. In this manner, the user may alter the message so that the attribute conforms to the limit to ensure delivery. Tests may be provided to enable a user to exceed a limit and some users may be pre-authorized to exceed a limit.

21 Claims, 8 Drawing Sheets

COMMUNICATING WITH RECIPIENT EMAIL SERVER WHILE COMPOSING EMAIL

FIELD OF DISCLOSURE

The claimed subject matter relates generally to electronic communication and, more specifically, to techniques for a negotiation among email clients and email servers corresponding to a potential email message.

SUMMARY

As computing devices have proliferated, users throughout the world have employed these computing devices to communicate. One common form of electronic communication is electronic mail (email). Currently, a user composes an email message and transmits the email to one or more recipients. There are a number of possible results for any particular email message. For each particular recipient, a message may be delivered, with or without notice, rejected, with or without notice, forwarded to another party and so on. For example, some messages are transmitted with a request for notification of receipt. Typically, a recipient may choose to acknowledge the receipt or not. Messages may be rejected for a number of reasons including, but not limited to, a full mailbox at the recipient's mail server and an origination address/domain that is on a blocked sender/domain list. Other potential causes for the rejection of email are because a particular email exceeds a set limit on the size of an attachment or because the email violates rules designed to prevent unsolicited mail.

Provided are techniques for the transmission of electronic mail, of "email." Among other features, the techniques include specifying a first recipient of an email message; notifying an email server associated with the email message and the first recipient; transmitting a parameter associated with the email message to the email server; and transmitting the email message to the first recipient via the email server in response to a first message from the email server indicating that the parameter meets an acceptability limit.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
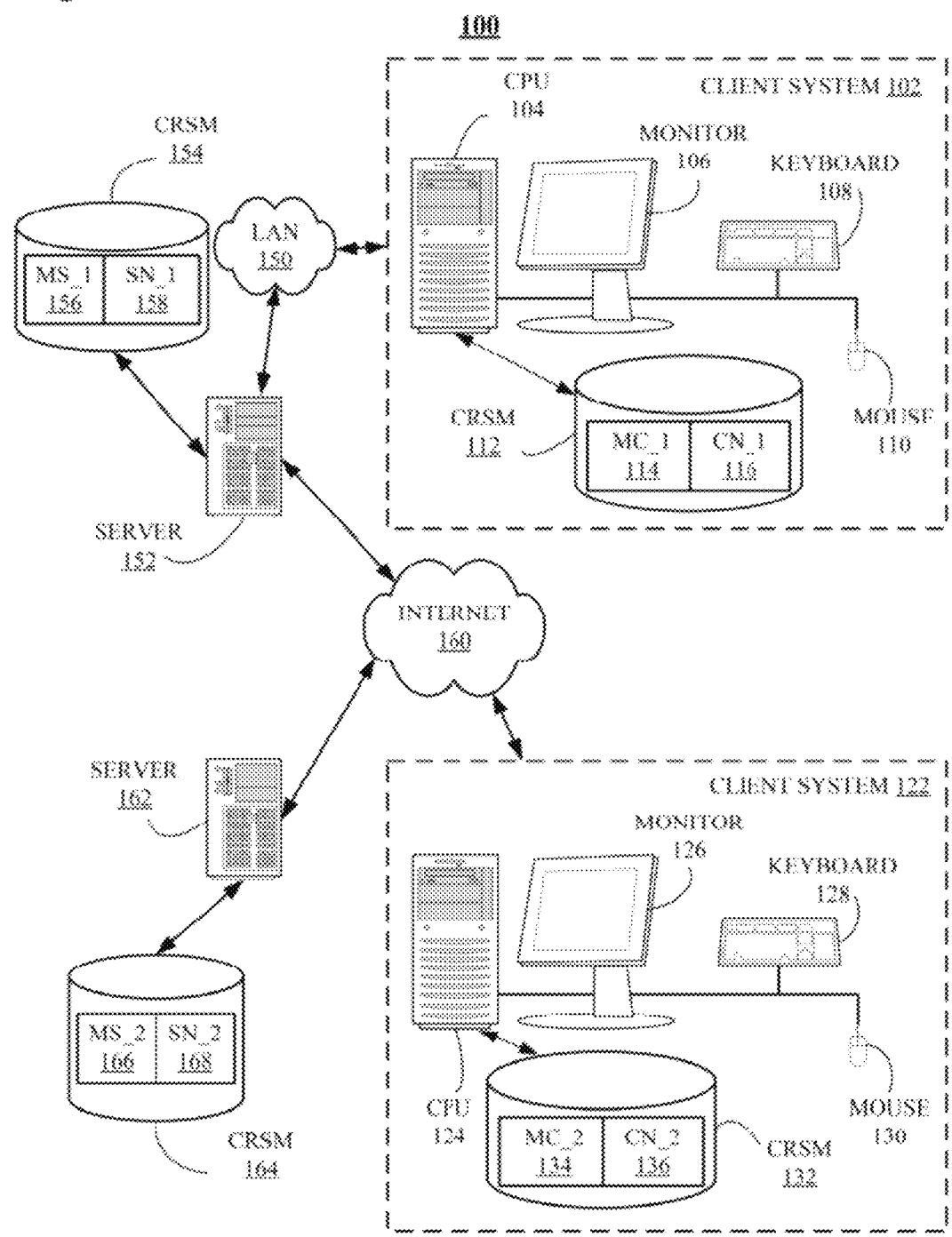
FIG. 1 is a block diagram of one example of a computing architecture that implements the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of one example of a computing architecture 100 that implements the claimed subject matter. It should be understood that computing architecture is merely one example and that the disclosed and claimed technology is equally applicable to practically any architecture that supports electronic communications. In addition, although described with respect to email, the disclosed techniques are equally applicable to other types of communication including, but not limited to, text messaging.

A client system 102 includes a central processing unit (CPU), or processor, 104, coupled to a monitor 106, a keyboard 108 and a pointing device, or mouse 110, which together facilitate human interaction with computing system 100 and client system 102. Also included in client system 102 and attached to CPU 104 is a computer-readable storage medium (CRSM) 112, which may either be incorporated with CPU 104 i.e. an internal device, or attached externally to CPU 104 by means of various, commonly available connection devices such as but not limited to, a universal serial bus (USB) port (not shown). Devices such as CPU 104, monitor 106, keyboard 108, mouse 110 and CRSM 112 will be familiar to those with skill in the relevant arts. CRSM 112 is illustrated storing an email client, or MC_1 114, and a client negotiator, or CN_1 116, which in this example is implemented as a component of MC_1 114.

In a similar fashion, a client system 122 also includes a central processing unit (CPU) 124, coupled to a monitor 126, a keyboard 128 and a mouse 130, which together facilitate human interaction with computing system 100 and client system 122. Also included in client system 122 and attached to CPU 124 is a CRSM 132, which may either be incorporated with CPU 124 i.e. an internal device, or attached externally to CPU 124 by means of various, commonly available connection devices such as but not limited to, a universal serial bus (USB) port (not shown). CRSM 132 is illustrated storing an email client, or MC_2 134, and a client negotiator, or CN_2 136, which in this example is a component of MC_2 134. It should be noted that in the following example the role of CN_2 136, as a recipient of email, is typically limited to the setting of configuration options with respect to the disclosed technology.

Client system 102 is coupled to a local area network (LAN) 150 that provides connectivity between client system 102 and a server 152. Server 152 and client system 102 are coupled to the Internet 160, which provides connectivity among client systems 102 and 122, server 152 and a server 162. Typically, servers 152 and 162 would each include a CPU, monitor keyboard and pointing device, such as devices 104, 106, 108 and 110, which for the sake of simplicity are not illustrated. Servers 152 and 162 are each coupled to a data storage device, i.e. CRSMs 154 and 164, respectively. CRSM 154 stores a mail server, or MS_1 156, and a server negotiator, or SN_1 158, both of which are executed on a CPU (not shown) associated with server 152. CRSM 164 stores a mail server, or MS_2 166, and a server negotiator, or SN_2 168, both of which are executed on a CPU (not shown) associated with server 162. The function of MC_1 114, CN_1 116, MC_2 134, CN_2 136, MS_1 156, SN_1 158, MS_2 166 and SN_2 168 are explained in more detail below in conjunction with FIGS. 2-8. Briefly, components 114, 116, 134, 136, 156, 158, 166 and 168 implement one example of an email system that employs the claimed subject matter. It should be noted there are many possible computing system configurations, of which computing system 100 is only one simple example.

Figure 2:
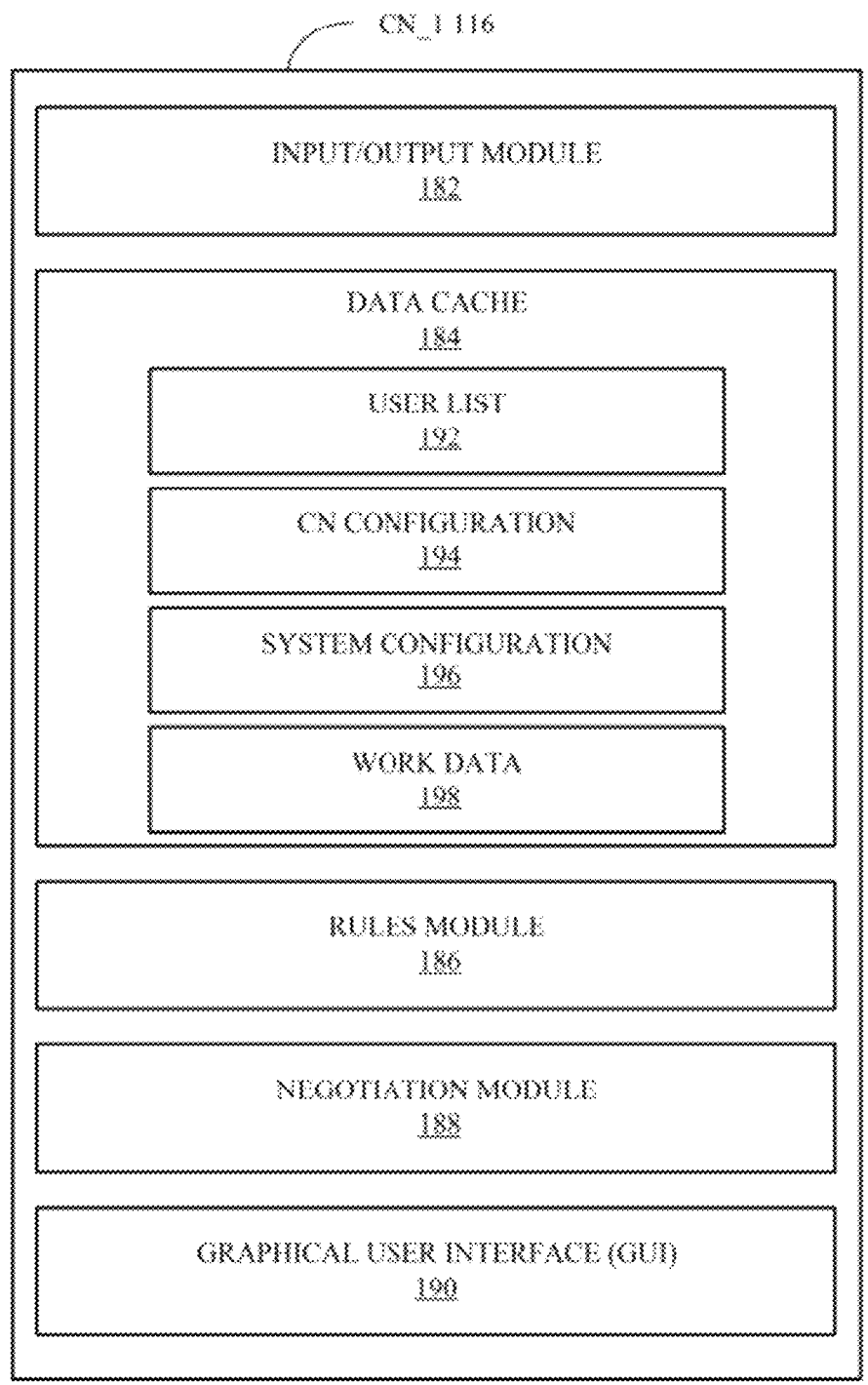
FIG. 2 is a block diagram of a client negotiator introduced in FIG. 1 in more detail.

FIG. 2 is a block diagram of CN_1 116, first introduced above in conjunction with FIG. 1. In this example, CN_1 116 is stored on CRSM 112 and executed on CPU, or processor, 104 of client system 102. As mentioned above, CN_1 116 may be incorporated into an email program such as MC_1 114, a stand-alone module or a plug-in module to MC_1 114 or part of an operating system (not shown). In addition, processing associated with by CN_1 116 may be provided by a remote web service available over LAN 150 and the Internet 160. Further, the representation of CN_1 116 in FIG. 2 is a logical model. In other words, components 182, 184, 186, 188 and 190 may be stored in the same or separates files and loaded and/or executed within client system 102 either as a single system or as separate processes interacting via any available inter process communication (IPC) techniques.

Input/Output (I/O) module 182 handles communication CN_1 116 has with other components of system 100 and client system 102. One example of a task that requires communication includes, but is not limited to, negotiation with any of SN_1 158, SN_2 168 and CN_2 136. Data cache 184 is a data repository for information that CN_1 116 requires during normal operation. Examples of the types of information stored in data cache 184 include a user list 192, CN Configuration information 194, system configuration information 196 and work data 198.

User list 192 stores the names of email users with whom the user of CN_1 116 expects to negotiate in accordance with the claimed subject matter. In conjunction with each listed user, user list 192 may store information concerning permissions and potential limits to negotiation. For example, one particular user may be permitted to receive large files while another user is not. CN configuration 194 stores information that controls the operation of CN_1 116. For example, CN_1 116 may be configured to prevent receipt of any file from any user over a certain size or to require a user or administer explicitly approve some file transfers. System configuration 196 stores information on other negotiating elements of system 100. For example, system configuration 196 may store data relating to elements CN2 136, SN_1 158 and SN_2 168 as well as corresponding permissions and limits. In addition, there may be default permissions and limitations defined for unlisted elements that may be discovered during normal processing. For example, an unlisted email server may be queried as to whether or not the unlisted server has the requisite functionality to perform negotiations in accordance with the claimed subject matter. Work data 198 stores the results of intermediate calculations and processing such as the negotiated limits on an ongoing email transaction.

Rules module 186 includes logic for defining the terms of negotiation and controls the operation of a Negotiation module 188. For example rules module 186 may specify a hierarchy among elements of data cache 184 when CN_1 116 encounters conflicting permissions and/or limitations during a particular negotiation. Negotiation module 188 implements the rules defined in rules module 186 in conformity with configuration information stored in user list 192, CN configuration 194 and system configuration 198. Components 182, 184, 186, 188, 190, 192, 194, 196 and 198 are described in more detail below in conjunction with FIGS. 3-8. Finally, GUI component 190 enables users and administrators of CN_1 116 to interact with and to define the desired functionality of CN_1 116 by setting parameters stored in the described elements of data cache 184

Figure 3:
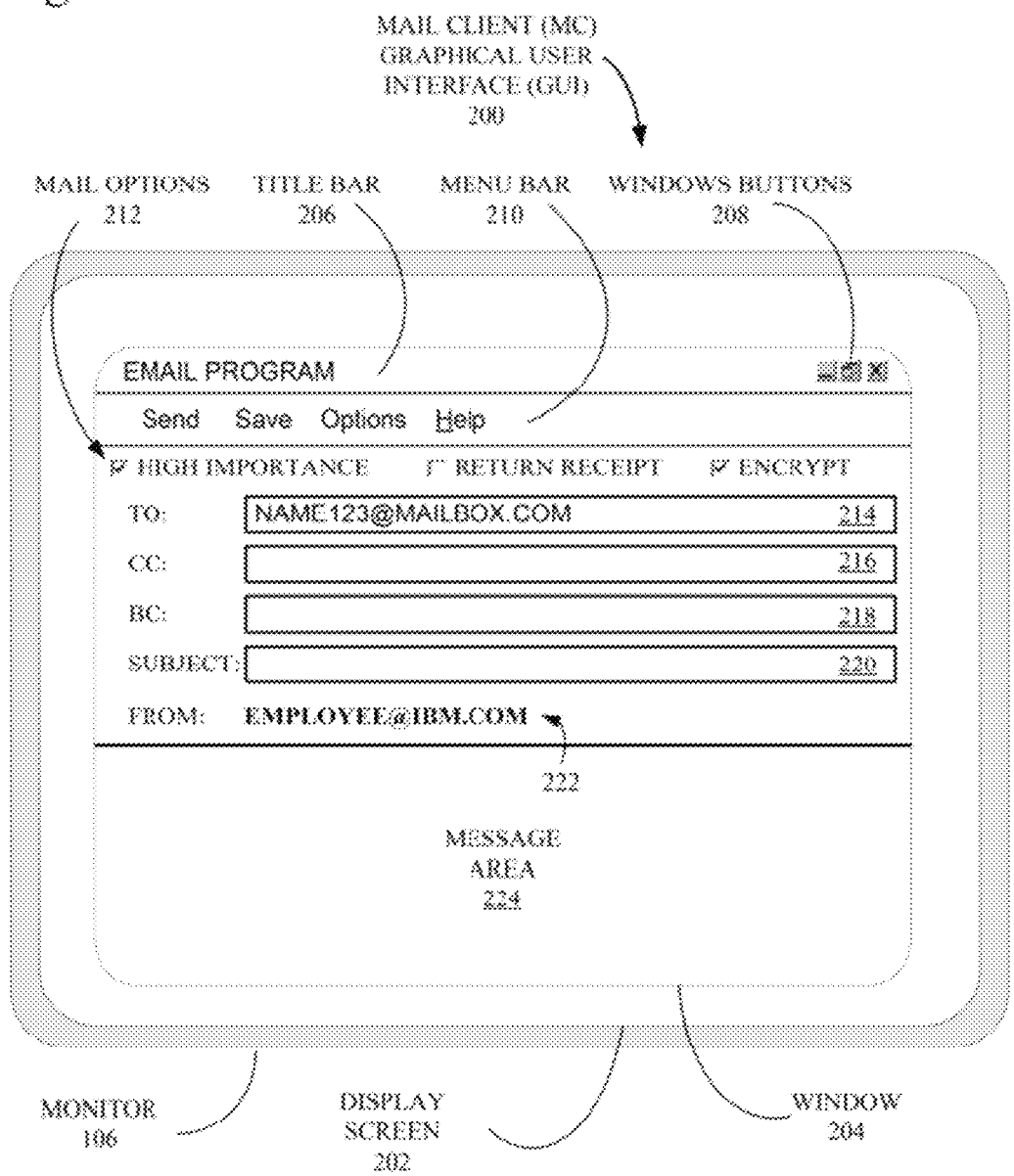
FIG. 3 is an illustration of a graphical user interface (GUI) associated with a mail client first introduced above in conjunction with FIG. 1.

FIG. 3 is an illustration of a mail client (MC) graphical user interface (GUI) 200 associated with MC_1 114 first introduced above in conjunction with FIG. 1. GUI 200 facilitates the sending and receiving of email and will be familiar to those with skill in the relevant arts. GUI 200 is displayed in a window 204, which is displayed within a display screen 202 of monitor 106 (FIG. 1) of client system 102 (FIG. 1). A Title bar 206 displays the name of the program with which GUI 200 is associated, or in this example "Email Program." Window buttons 208 provide means to implement common window functions such as the minimization, maximization and closing, or termination, of window 202 and GUI 200. A Menu bar 210 provides means to implement common functions associated with a particular email message displayed in window 204. Illustrated examples of such functions include, "Send," "Save," "Options" and "Help." In this example, the current message is marked of high importance and to be encrypted prior to transmission. A mail options area 212 enables a user to set or unset various options associated with the current message. Some illustrated examples include specifying "High Importance," requesting a "Return Receipt" and a request to "Encrypt" the current message prior to transmission.

Other illustrated fields include and "TO" text entry box 214, a "CC" text entry box 216, a "BC" text entry box 218, a "SUBJECT" box 220, a "FROM" box 222 and a message area 224. The message is addressed to "NAME123@MAILBOX.COM" and being composed by a user associated with the address "EMPLOYEE@IBM.COM." Fields 214, 216, 218, 220, 222 and 224 will be familiar to those have used email programs and are employed if the following figures to illustrate functionality associated with the claimed subject matter.

In the following examples, the addressee, "NAME123@MAILBOX.COM," is associated with a user on client system 122 (FIG. 1) and the user composing the email is associated with a user on client system 102. In addition, mail initiated on client system 102 is processed by MC_1 114, CN_1 116 and transmitted via MS_1 156 (FIG. 1). Mail received on client system 102 is typically transmitted to MC_1 114 via MS_1 156. In a similar fashion, mail transmitted to and from client system 122 is processed via MC_2 134 and MS_2 166 on server 162.

Figure 4:
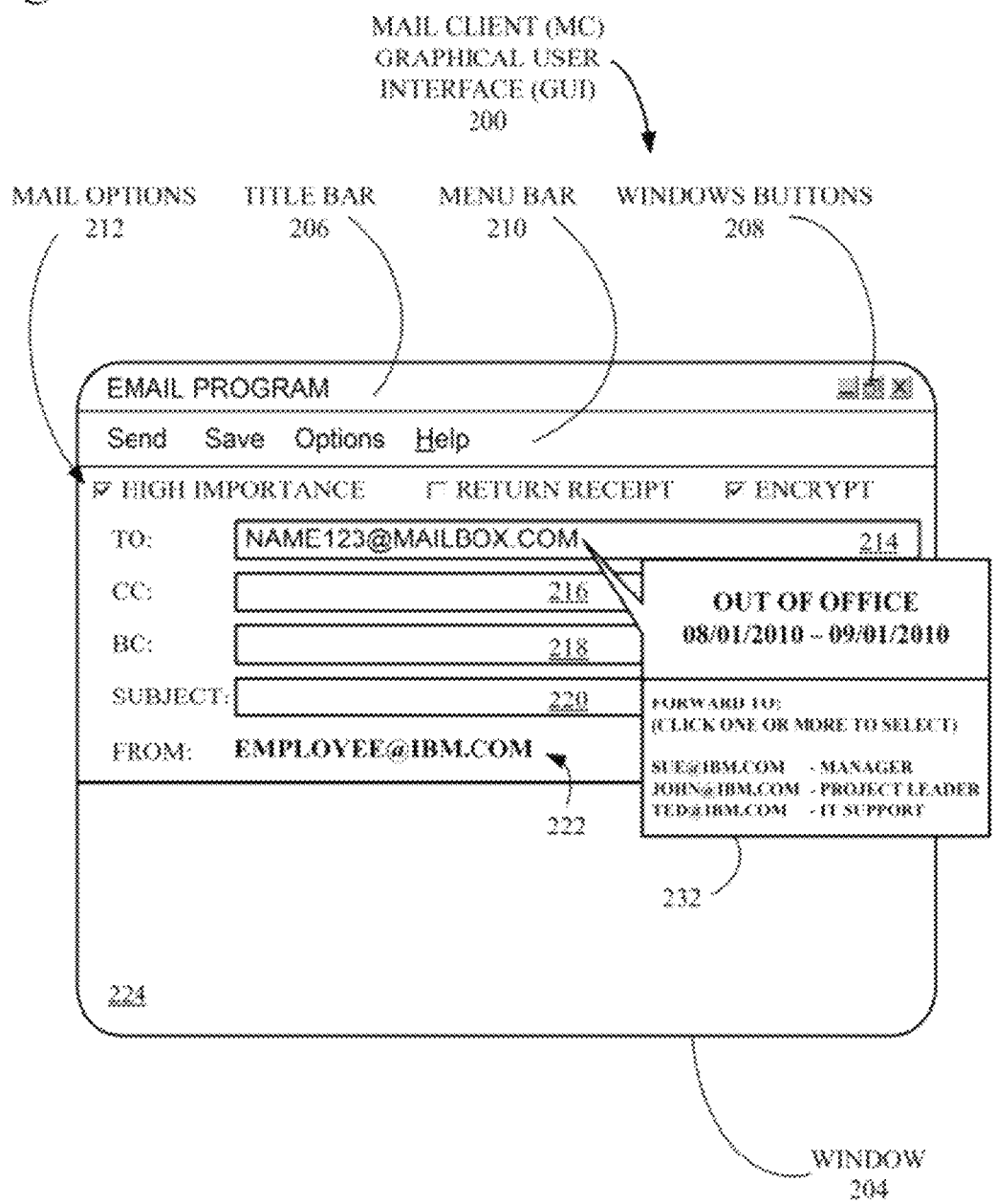
FIG. 4 is an illustration of the graphical user interface (GUI) of FIG. 3 with a user notification generated by the client negotiator of FIGS. 1 and 2.

FIG. 4 is an illustration of window 204 (FIG. 3) of GUI 200 (FIG. 3) with a user notification 232 generated by the client negotiator of FIGS. 1 and 2. Once the user composing the displayed message, or the "originating user," has entered the intended recipient into TO box 214, CN_1 116 communicates with SN_1 158 (FIG. 1), which communicates with SN_2 168 to determine if any special conditions apply to the message being composed by the originating user. SN_2 168 transmits notice 232 back to SN_1 158, which transmits notice to CN_1 116, which notifies the originating user via GUI 200. In this example, user notification 232 indicates that the intended recipient, "NAME123@MAILBOX.COM," is "OUT OF OFFICE" from Aug. 1, 2010 to Sep. 1, 2010" and offers the originating user the option of sending the email to one or more alternative addresses, i.e. "SUE@IBM.COM," "JOHN@IBM.COM" and TED@IBM.com," who are a manager, a project leader and IT support, respectively. It should be noted that this processing may be done before the originating user has even completed composing the email message 224. In this manner, the originating user may edit the intended message based upon a new intended recipient.

Notification 232 may originate at any of SN_1 158 or SN_2 168 as a query transmitted along the chain depending upon which component 158, 168 or 132 has access to the relevant information. Although in this example, information concerning an "OUT OF OFFICE" message is stored in MS_2 166 in conjunction with information about the intended recipient. The processing of email information is explained in more detail below in conjunction with FIGS. 7-8.

Figure 5:
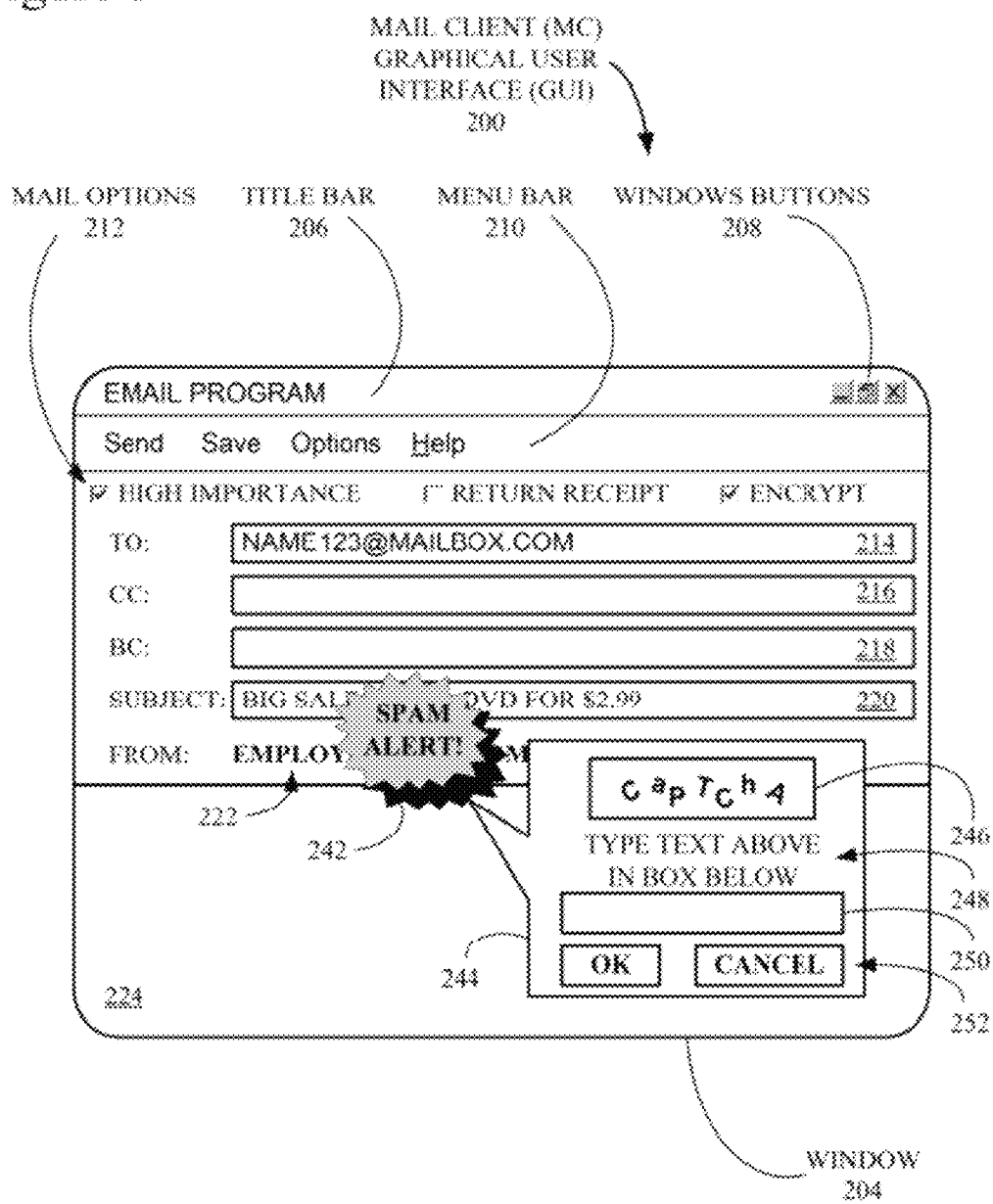
FIG. 5 is an illustration of the graphical user interface (GUI) of FIGS. 3 and 4 with a user notification generated by the server negotiator of FIG. 1.

FIG. 5 is an illustration of GUI 200 of FIGS. 3 and 4 with a user notification initiated by SN_2 168 of FIG. 1. In FIG. 5, the originating user has entered some information in Subject text entry box 220, or "BIG SALE: BUY A DVD FOR $2.99," which has triggered a "Spam Alert!" 242. In addition to notification 242, a captcha 244 has been generated.

As those with skill in the relevant arts will understand, captcha 244 is a data entry device that presents the user with a graphic 246 that is relatively easy for a human to understand but difficult for a computer to decipher. By entering a word displayed in graphic 246 into a text entry box 250, SN_2 168 is able to verify that a human is sending the email rather than an automated mail program, or "mailbot." Instructions 248 explain to the user what is expected and OK and Cancel buttons 252 enable the user to proceed or cancel the access attempt, respectively. In this case, anti-spam message 242 and captcha 244 have been generated by MC_1 114 based upon information received from SN_2 168 and a corresponding configuration parameter that applies to any client system, such as client system 102.

It should be noted that a captcha is only one example of many different possible techniques to ensure that the email is from an acceptable party. For example, the email sender may be required to enter a password. In addition to the requirement that the email sender pass a test, a user may be pre-certified. In other words, a user may be provided a password that a negotiation module may verify so that a test is not necessary. In this manner, a user may transmit from different email addresses without the need for the negotiation module to know each different email address.

Figure 6:
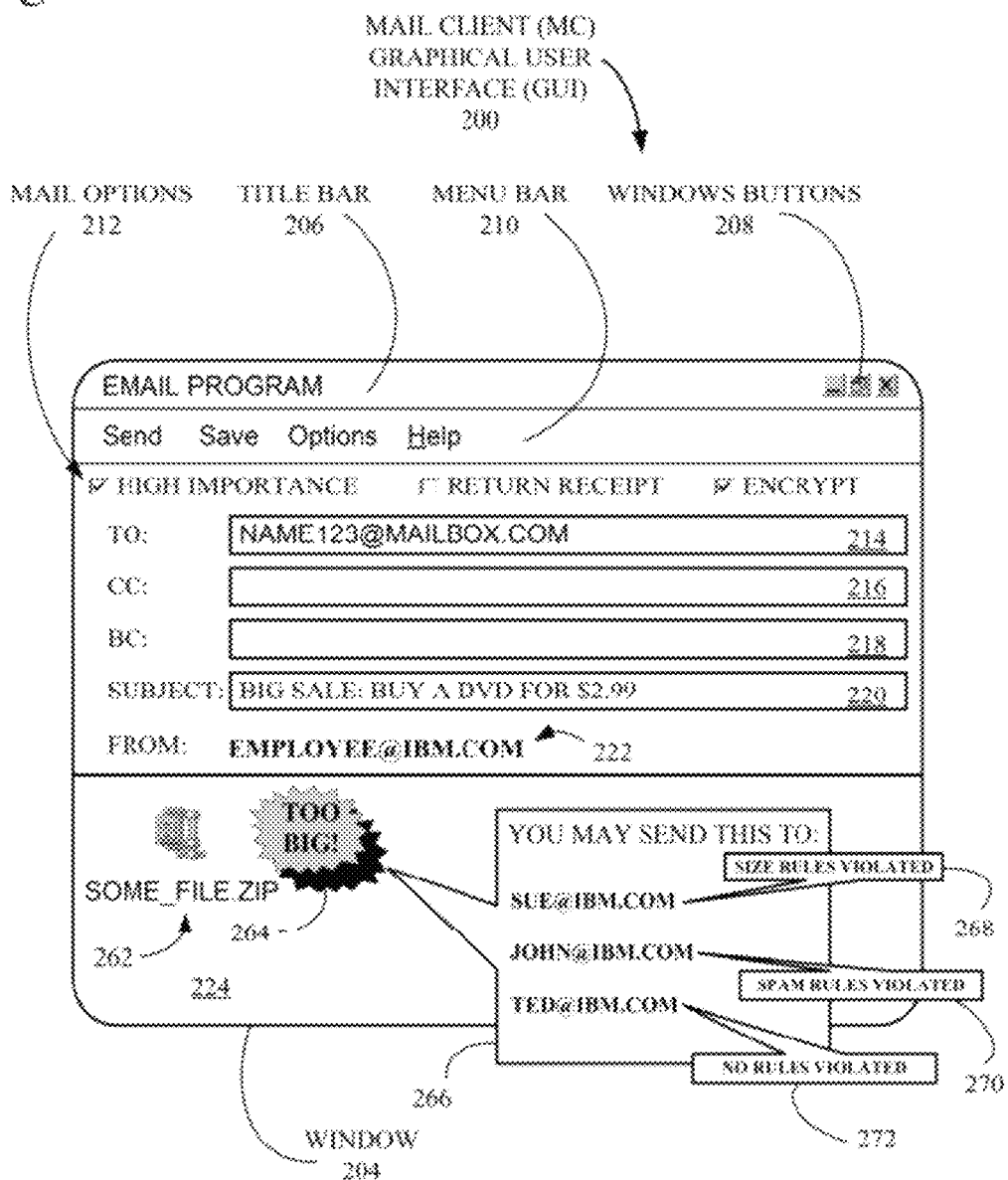
FIG. 6 is an illustration of the graphical user interface (GUI) of FIGS. 3, 4 and 5 with a user notification generated by the server negotiator of FIG. 1.

FIG. 6 is an illustration of GUI 200 of FIGS. 3, 4 and 5 with a user notification initiated by SN_2 168 of FIG. 1. In this example, a file, "SOME_FILE.ZIP," 262 has been attached to the email message. CN_1 116 has communicated with SN_1 158, which in turn has notified SN_2 168 of the attachment, including the size of the corresponding file. SN_2 168 has responded to CN_1 116 via SN_1 158 that the file exceeds a file size limitation. At that point, MC_1 114 has generated a message 264, which states that attachment 262 is "TOO BIG." In addition, CN_1 116 provides information of alternative destinations 266 for that attachment. Alternative destinations 266 indicates that the attachment may be transmitted to the address "SUE@IBM.COM" without violating any file size restrictions 268, to the address "JOHN@IBM.COM" without violating the anti-spamming rules 270 (see FIG. 5) or to the address "TED@IBM.COM" without violating any rules 272. In other words, a negotiation is occurring in which the originating user can choose to send the original message to "TED@IBM.COM," can choose to remove the attachment and send the message to "SUE@IBM.COM" or choose to edit Subject text entry box 220 and transmit the message to "JOHN@IBM.COM." This negotiation is occurring while the email message is in the process of being composed thereby eliminating the chance that a message is transmitted and then rejected either because the original recipient is "OUT OF OFFICE," subject 220 would be rejected as spam, or unsolicited, or attachment 262 exceeds a size requirement.

Figure 7:
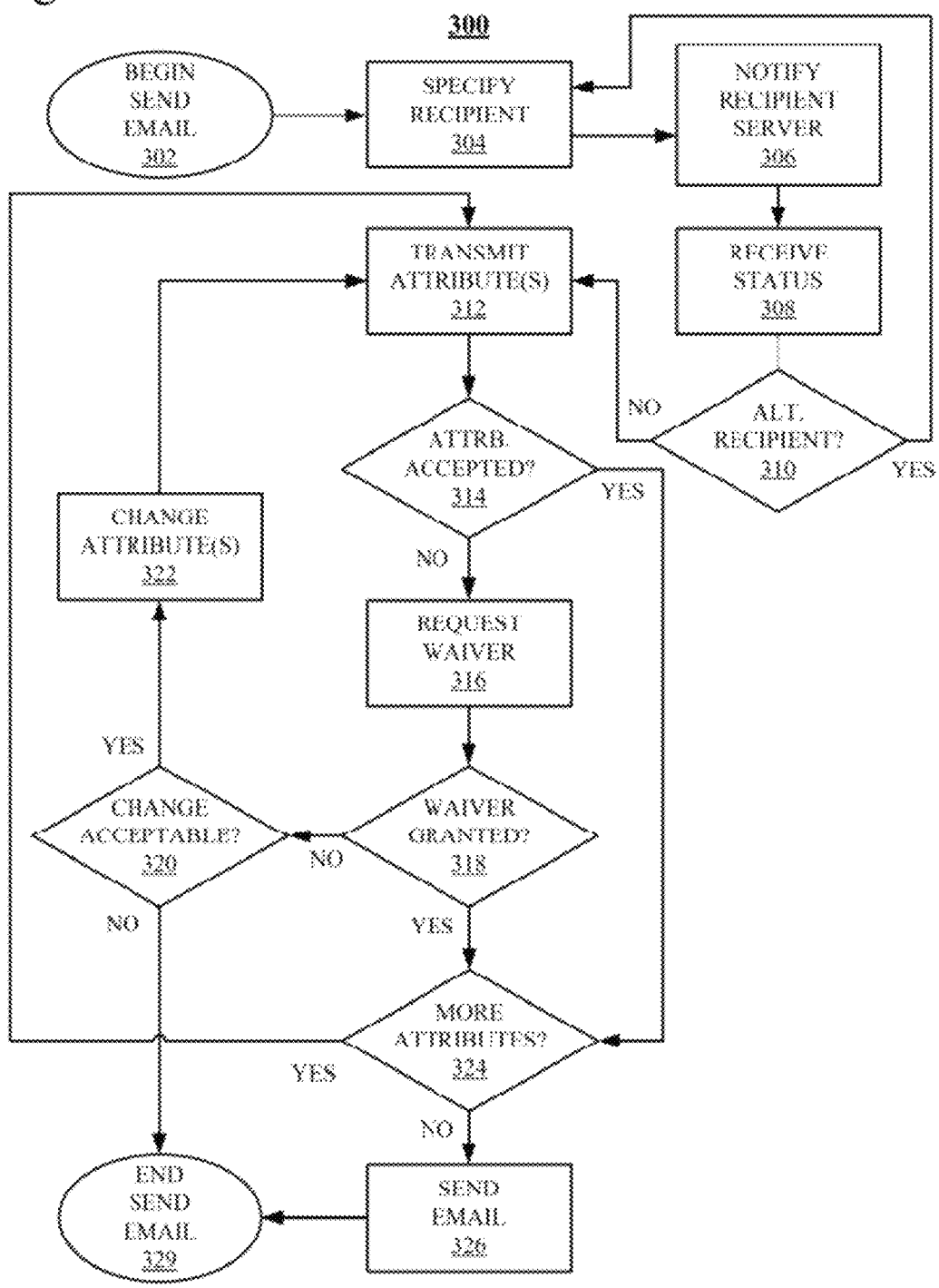
FIG. 7 is a flowchart of a Send Email process that implements aspects of the claimed subject matter.

FIG. 7 is a flowchart of a Send Email 300 process that implements aspects of the claimed subject matter. In this example, logic associated with process 300 is stored on CRSM 112 and CRSM 154 (FIG. 1) as part of CN_1 116 and SN_1 158 (FIG. 1) and executed on processor 104 (FIG. 1) and a processor (not shown) associated with server 152 (FIG. 1). In other words, CN_1 116 and SN_1 158 may both be involved in the execution of process 300. In the following example, the sender is associated with MC_1 114 (FIG. 1), which is serviced by MS_1 156 (FIG. 1). The intended recipient is "NAME_123" at the domain "MAILBOX.COM," MC_2 134 (FIG. 1) is the email program employed by NAME_123 and MS_2 166 (FIG. 1) is the corresponding mail server.

Process 300 starts in a "Begin Send Email" block 302 and proceeds immediately to a "Specify Recipient" block 304. During processing associated with block 304, process 300 operates based upon the sender's entry of a recipient in a TO text entry box (see 214, FIG. 3) of an email message being composed. During processing associated with a "Notify Recipient Server" block 306, CN_1 116 has transmitted data identifying the intended recipient to SN_1 158; SN_1 158 identifies the intended recipient, i.e. NAME_123, and notifies the intended recipient's mail server, or MS_2 166. During processing associated with a "Receive Status" block 308, MS_1 156 and SN_1 158 receive a message from SN_2 168 indicating the status of the intended recipient. Examples of possible statuses include, but are not limited to, "AVAILABLE," "OUT-OF-OFFICE," "UNAVAILABLE" and "UNKNOWN." In this manner, the disclosed technology prevents email that has an incorrect or misspelled entry for a recipient from proceeding. Although not illustrated in FIG. 7, at this point the sender may have several options depending upon the recipient's status. For example, if NAME_123 is OUT-OF-OFFICE, CN_1 116 may notify the sender and offer a number of alternate recipients (see 232, FIG. 4). If, during processing associated with an "Alternate (Alt.) Recipient?" block 310, the sender selects an alternative recipient, process 300 returns to block 304 and processing continues as described above.

Once a recipient has been selected during iterations through blocks 304, 306, 308 and 310, process 300 proceeds to a "Transmit Attribute(s)" block 312. During processing associated with block 312 attributes of the email being composed are transmitted to SN_2 168 as they are entered, either one at a time or in groups. For example, once a SUBJECT text entry box (see 220, FIG. 5) has been completed, the entered text is transmitted to SN_2 168 for review. Another example of a transmitted attribute may be the size of an attachment (see 262, FIG. 6). During an "Attributes (Attrb.) Accepted?" block 314, process 300, after receiving a message from SN_2 168 concerning the attribute transmitted during block 312, determines whether or not SN_2 168 has indicated the attribute is acceptable for receipt, i.e. the corresponding email will not be filtered or rejected based upon a violation of SN_Ts policies. In addition, the sender is notified in the event an attribute has been deemed unacceptable (see 242, FIG. 5; 264, FIG. 6) and may be offered alternative recipients (see 266, FIG. 6) in conjunction with limitations that may be applicable to the alternative recipients (see 268, 270 and 272, FIG. 6). Although not illustrated, if the sender picks an alternate recipient, control returns to block 304.

During processing associated with a "Request Waiver" block 316, SN_1 158 may request the SN_2 168 grant an exception, or "ticket," so that the intended email may be received despite, the issue with a particular attribute. In the alternative, processing associated with block 316 may be initiated automatically without an explicit request. As a condition of such a waiver, SN_2 168 may require a test. For example, a captcha may be employed so that SN_2 168 can verify that the sender is not an automated program, or "mailbot" (see 244, FIG. 5). Another possible test may be entry of a password. In the alternative, the user may be provided with a ticket such as a password that pre-authorizes granting of a waiver. During processing associated with a "Waiver Granted?" block 318, process 300 determines, based upon a message from SN_2 168, whether or not a waiver, or ticket, (if requested) has been granted. If not, process 300 proceeds to a "Change Acceptable?" block 320. During processing associated with block 320, the user determines whether or not a change in the email field with the rejected attribute can or should be made. If so, during processing associated with a "Change Attribute(s)" block 322, the user makes the needed change. Control then returns to block 312 and processing continues as described above with respect to the changed attribute.

If an attribute is deemed acceptable during processing associated with block 314, or if there is a determination that a waiver has been granted during processing associated with block 318, process 300 proceeds to a "More Attributes?" block 324. During processing associated with block 324, process 300 determines whether or not there are more attributes to check, i.e. the email message is not complete. If so, processing returns to block 312, the next attribute is transmitted and processing continues as described above. If not, process 300 proceeds to a "Send Email" block 326. During processing associated with block 326, MS_1 156 transmits the completed email. In this manner a sender may be confident that the email will be accepted by the recipient.

Finally, once an email has been transmitted during processing associated with block 326 or the user has determined that a change to the email is not acceptable and a waiver has not been granted during processing associated with block 320, control proceeds to an "End Send Email" block 329 during which process 300 is complete.

It should be noted, that process 300 is only one example of an implementation of the claimed subject matter. For example, process 300 is based upon a configuration in which SN_2 168 is operating such that potential senders are not informed of the specific limitations placed on particular attributes. SN_2 168 may have a "privacy" setting that specifies a choice between a privacy setting associated with process 300 and another setting in which, in which in addition to receiving a status during processing associated with block 308, SN_1 158 receives a list of acceptable values for particular attributes. Further, different senders or domains may be associated with different limitations.

Figure 8:
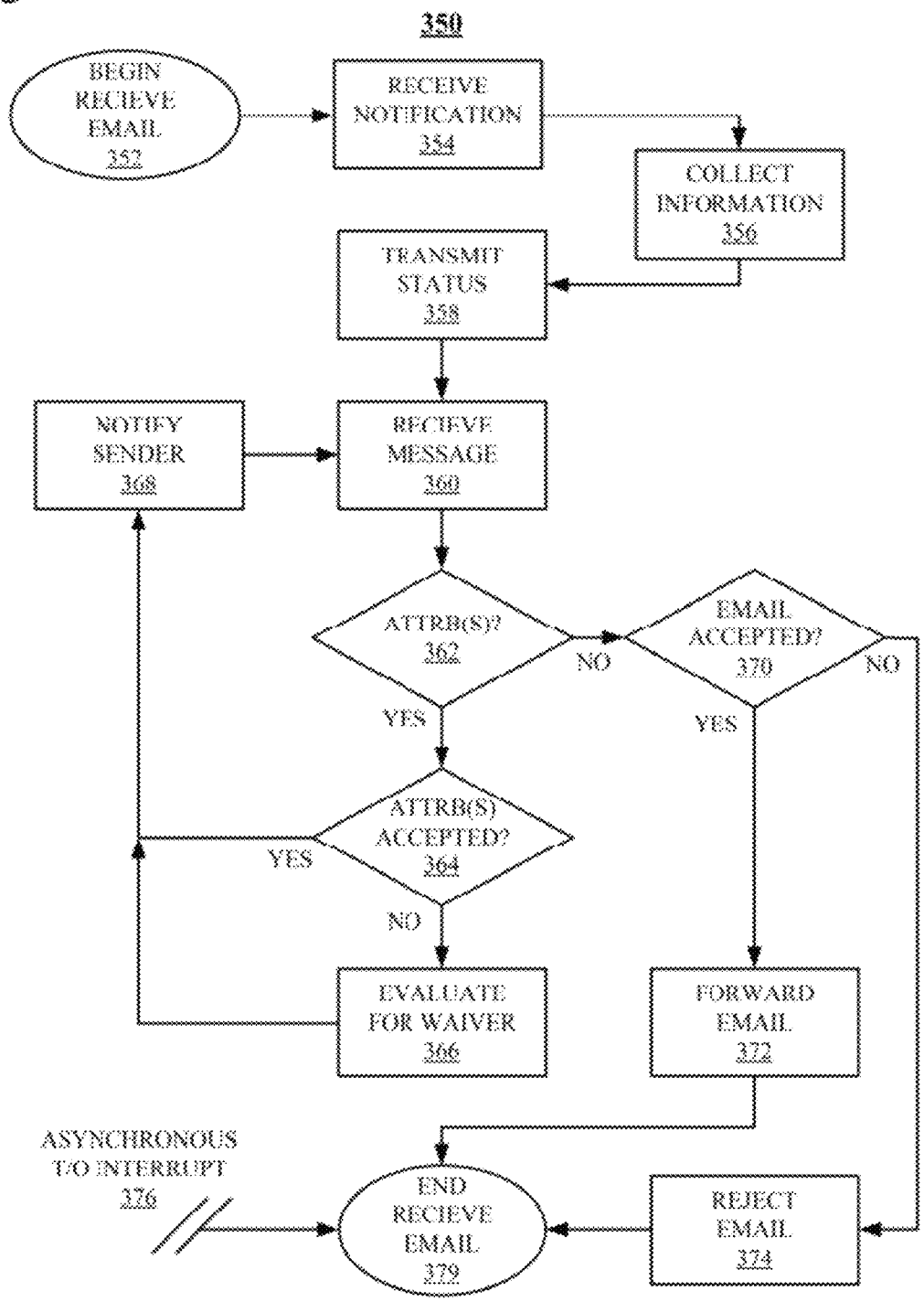
FIG. 8 is a flowchart of a Receive Email process that implements aspects of the claimed subject matter.

FIG. 8 is a flowchart of a Receive Email process 350 that implements aspects of the claimed subject matter. In this example, logic associated with process 350 is stored on CRSM 132 and CRSM 164 (FIG. 1) as part of MS_2 166 and SN_2 168 (FIG. 1) and executed on a processor (not shown) associated with server 162 (FIG. 1). In other words, MS_2 166 and SN_2 168 may be involved in the execution of process 300. As in the example described above in conjunction with FIG. 7, the sender is associated with MC_1 114 (FIG. 1), which is serviced by MS_1 156 (FIG. 1). The intended recipient is "NAME_123" at the domain "MAIL-BOX.COM," MC_2 134 (FIG. 1) is the email program employed by NAME_123 and MS_2 166 (FIG. 1) is the corresponding mail server.

Process 350 starts in a "Begin Receive Email" block 352 and proceeds immediately to a "Receive Notification" block 354. During processing associated with block 354, MS_2 166 and SN_2 168 receive notification that a sender configured in accordance with the claimed subject matter is composing an email (see 304 and 306, FIG. 7). During processing associated with a "Collect Information" block 356, process 350 gathers information about the intended recipient, their status and any limitations that may apply to that particular recipient. For example, one particular recipient may have a higher size limit for attachments than another potential recipient. During processing associated with a "Transmit Status" block 358, SN_2 168 transmits the intended recipients status to SN_1 158 and CN-1 116, perhaps including information identifying alternate recipients (see 234, FIG. 4).

At this point, SN_2 168 waits for a response from the sender. During processing associated with a "Receive Message" block 360, process 350 receives a message from SN_1 158. Typically a message received during processing associated with block 260 is either a transmission of attributes to be checked (see 312, FIG. 7) or an email message (see 326, FIG. 7). Of course another possibility, which is not illustrated, is that the sender has selected a different recipient (see 310, FIG. 7) and, in that case, process 300 would be either be reinitiated via block 352 or reentered via block 354 and processing would proceed as described above.

During processing associated with a "Attribute(s) (Attrb(s))?" block 362, process 350 determines whether or not the message received during processing associated with block 360 is a list of one or more attributes to be checked or an email message. If determined to be attributes to be checked, control proceeds to an "Attrb(s) Accepted?" block 364. During processing associated with block 364, process 300 checks the attributes received based upon the sender identified during processing associated with block 354 and information collected during processing associated with block 356 and determines whether or not the attributes are acceptable. If not, process 300 proceeds to an "Evaluate for Waiver" block 366. During processing associated with block 366, SN_2 168 makes an evaluation as to whether or not a waiver is acceptable, perhaps in response to a request for a waiver. As explained above in conjunction with FIG. 7, a waiver may be granted passed upon a sender passing some type of test such as, but not limited to, entry of a password or a captcha. In addition, a sender may be pre-authorized for a waiver based upon a ticket such as a password incorporated into the message related to the attribute. Once an attribute has been rejected or accepted, either because the attribute is within limits or has been granted a waiver, or ticket, SN_2 168 notifies the sender during processing associated with a "Notify Sender" block 368. Control then returns to block 360 and processing continues as described above.

If during processing associated with block 362, SN_2 168 determines that the message received during processing associated with block 360 is a email rather than a list of one or more attributes, control proceeds to an "Email Accepted?" block 370. During processing associated with block 370, SN_2 166 determines whether or not the received emails meets all the limitations associated with the sender. If so, the email is sent to MC_2 134 for delivery to the intended recipient during processing associated with a "Forward Email" block 372. If not, the email is rejected during processing associated with a "Reject Email" block 374 and any appropriate processing associated with the rejection of email may be executed.

Finally, control processes to an "End Receive Email" block 379 during which process 350 is complete. It should be noted that in the event a sender determines that a particular email will not be sent communication between SN_1 158 and SN_2 168 is probably concluded. In that scenario, process 350 typically proceeds to block 379 via an asynchronous timeout (T/O) interrupt 376. Although illustrated as proceeding sequentially, processing associated with both FIGS. 7 and 8 may also proceed concurrently. For example, the checking of an attribute may proceed concurrently with the entry of other fields in an email being composed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for transmitting electronic mail (email), comprising:
   receiving a first address of a first recipient of an email message, wherein the first recipient is associated with a recipient computing device;
   notifying an email server, associated with the email message and the first recipient, of the first address;
   transmitting a parameter associated with the email message to the email server;
   receiving a first message from the email server indicating that the parameter is not acceptable to the email server;
   notifying a sender of the email message that the parameter is not acceptable to the email server; and
   not transmitting the email message to either the recipient computing device or the email server in response to a first message from the email server indicating that the parameter is not acceptable to the email server.

2. The method of claim 1, further comprising:
   receiving from the sender a modified email message corresponding to a modified parameter such that the modified parameter is acceptable to the email server; and
   transmitting the modified email message to the first recipient via the email server.

3. The method of claim 1, further comprising:
   displaying to a sender of the email message availability information specifying that the first recipient cannot, based upon the parameter, receive the first email message and that an alternative recipient can receive the first email message;
   receiving an indication to transmit the first email message to the alternative recipient in response to the availability information; and
   transmitting the email message to the alternative recipient rather than the first recipient via the email server.

4. The method of claim 1, wherein the parameter is a size of an attachment.

5. The method of claim 1, wherein the parameter is a subject line and the acceptability of the parameter corresponds to a restriction on unsolicited email.

6. The method of claim 1, further comprising:
   receiving a modified email message corresponding to a changed parameter in response to an indication that the parameter is unacceptable to the email server;
   transmitting the changed parameter associated with the email message to the email server; and
   transmitting the modified email message to the first recipient via the email server in response to a second message from the email server indicating that the changed parameter is acceptable to the email server.

7. The method of claim 1, further comprising:
   forwarding a test from the email server to the sender of the first email message when the parameter is unacceptable; and
   transmitting the email message to the first recipient via the email server in response to a successful response to the test.

8. An apparatus for transmitting electronic mail (email), comprising:
   a processor;
   a computer readable storage medium; and
   logic, stored on the computer readable storage medium for execution on the processor, for:
   receiving a first address of a first recipient of an email message, wherein the first recipient is associated with a recipient computing device;
   notifying an email server, associated with the email message and the first recipient, of the first address;
   transmitting a parameter associated with the email message to the email server;
   receiving a first message from the email server indicating that the parameter is not acceptable to the email server;
   notifying a sender of the email message that the parameter is not acceptable to the email server; and
   not transmitting the email message to either the recipient computing device or the email server in response to a first message from the email server indicating that the parameter is not acceptable to the email server.

9. The apparatus of claim 8, the logic further comprising logic for:
   receiving from the sender a modified email message corresponding to a modified parameter such that the modified parameter is acceptable to the email server; and
   transmitting the modified email message to the first recipient via the email server.

10. The apparatus of claim 8, the logic further comprising logic for:
    displaying to a sender of the email message availability information specifying that the first recipient cannot, based upon the parameter, receive the first email message and that an alternative recipient is can receive the first email message;
    receiving an indication to transmit the first email message to the alternative recipient in response to the availability information; and
    transmitting the email message to the alternative recipient rather than the first recipient via the email server.

11. The apparatus of claim 8, wherein the parameter is a size of an attachment.

12. The apparatus of claim 8, wherein the parameter is a subject line and the acceptability of the parameter corresponds to a restriction on unsolicited email.

13. The apparatus of claim 8, the logic further comprising logic for:
receiving a modified email message corresponding to a changed parameter in response to an indication that the parameter is unacceptable to the email server;
transmitting the changed parameter associated with the email message to the email server; and
transmitting the modified email message to the first recipient via the email server in response to a second message from the email server indicating that the changed parameter is acceptable to the email server.

14. The apparatus of claim 8, the logic further comprising logic for:
forwarding a test from the email server to the sender of the first email message when the parameter is unacceptable; and
transmitting the email message to the first recipient via the email server in response to a successful response to the test.

15. A computer programming product for transmitting electronic mail (email), comprising:
a non-transitory computer readable storage medium; and
logic, stored on the computer readable storage medium for execution on a processor, for:
receiving a first address of a first recipient of an email message, wherein the first recipient is associated with a recipient computing device;
notifying an email server, associated with the email message and the first recipient, of the first address;
transmitting a parameter associated with the email message to the email server;
receiving a first message from the email server indicating that the parameter is not acceptable to the email server;
notifying a sender of the email message that the parameter is not acceptable to the email server; and
not transmitting the email message either to the recipient computing device or the email server in response to a first message from the email server indicating that the parameter is not acceptable to the email server.

16. The computer programming product of claim 15, the logic further comprising logic for:
receiving from the sender a modified email message corresponding to a modified parameter such that the modified parameter is acceptable to the email server; and
transmitting the modified email message to the first recipient via the email server.

17. The computer programming product of claim 15, the logic further comprising logic for:
displaying to a sender of the email message availability information specifying that the first recipient cannot, based upon the parameter, receive the first email message and that an alternative recipient is can receive the first email message;
receiving an indication to transmit the first email message to the alternative recipient in response to the availability information; and
transmitting the email message to the alternative recipient rather than the first recipient via the email server.

18. The computer programming product of claim 15, wherein the parameter is a size of an attachment.

19. The computer programming product of claim 15, wherein the parameter is a subject line and the acceptability of the parameter corresponds to a restriction on unsolicited email.

20. The apparatus of claim 15, the logic further comprising logic for:
forwarding a test from the email server to the sender of the first email message when the parameter is unacceptable; and
transmitting the email message to the first recipient via the email server in response to a successful response to the test.

21. A method, comprising:
receiving a first address of a first recipient of an electronic mail (email) message, wherein the first recipient is associated with a recipient computing device;
notifying an email server, associated with the email message and the first recipient, of the first address;
transmitting a parameter associated with the email message to the email server;
receiving a first message from the email server indicating that the parameter is not acceptable to the email server;
notifying a sender of the email message that the parameter is not acceptable to the email server;
not transmitting the email message to either the recipient computing device or the email server in response to a first message from the email server indicating that the parameter is not acceptable to the email server;
receiving from the sender a modified email message corresponding to a modified parameter such that the modified parameter is acceptable to the email server;
transmitting the modified email message to the first recipient via the email server;
displaying to a sender of the email message availability information specifying that the first recipient cannot, based upon the parameter, receive the first email message and that an alternative recipient can receive the first email message;
receiving an indication to transmit the first email message to the alternative recipient in response to the availability information; and
transmitting the email message to the alternative recipient rather than the first recipient via the email server;
receiving a modified email message corresponding to a changed parameter in response to an indication that the parameter is unacceptable to the email server;
transmitting the changed parameter associated with the email message to the email server; and
transmitting the modified email message to the first recipient via the email server in response to a second message from the email server indicating that the changed parameter is acceptable to the email server.

* * * * *